United States Patent
Mayer-Dick

(10) Patent No.: US 11,183,926 B2
(45) Date of Patent: Nov. 23, 2021

(54) DC-DC CONVERTER WITH OUTPUT-SIDE STORAGE CAPACITOR ARRANGEMENT

(71) Applicant: CPT GROUP GMBH, Hannover (DE)

(72) Inventor: Anton Mayer-Dick, Regensburg (DE)

(73) Assignee: CPT Group GmbH, Hannover (DE)

( * ) Notice: Subject to any disclaimer, the term of this patent is extended or adjusted under 35 U.S.C. 154(b) by 3 days.

(21) Appl. No.: 16/482,740

(22) PCT Filed: Jan. 24, 2018

(86) PCT No.: PCT/EP2018/051727
§ 371 (c)(1),
(2) Date: Aug. 1, 2019

(87) PCT Pub. No.: WO2018/141603
PCT Pub. Date: Aug. 9, 2018

(65) Prior Publication Data
US 2020/0244163 A1    Jul. 30, 2020

(30) Foreign Application Priority Data

Feb. 1, 2017    (DE) .......................... 102017201618.3

(51) Int. Cl.
*H02M 3/155*    (2006.01)
*H01G 11/04*    (2013.01)
*H01G 11/08*    (2013.01)

(52) U.S. Cl.
CPC ............ *H02M 3/155* (2013.01); *H01G 11/04* (2013.01); *H01G 11/08* (2013.01); *H02M 3/1555* (2021.05)

(58) Field of Classification Search
CPC .... H02M 3/155; H02M 3/1555; H01G 11/04; H01G 11/08; Y02E 60/13; F02D 2041/2006; H01H 11/04
See application file for complete search history.

(56) References Cited

U.S. PATENT DOCUMENTS

| | | | |
|---|---|---|---|
| 4,851,756 A * | 7/1989 | Schaller | H02J 7/0024 320/126 |
| 5,369,547 A | 11/1994 | Evans | |
| 7,823,860 B2 | 11/2010 | Ueda | |
| 2009/0002908 A1 | 1/2009 | Chiang | |

(Continued)

FOREIGN PATENT DOCUMENTS

| | | |
|---|---|---|
| CN | 201869094 U | 6/2011 |
| CN | 202384761 U | 8/2012 |

(Continued)

OTHER PUBLICATIONS

Wikipedia—Superkondensator, Jan. 4, 2017.
(Continued)

*Primary Examiner* — Nguyen Tran
*Assistant Examiner* — Trinh Q Dang
(74) *Attorney, Agent, or Firm* — Laurence A. Greenberg; Werner H. Stemer; Ralph E. Locher

(57) ABSTRACT

A DC-DC converter includes an output-side storage capacitor arrangement which has a parallel circuit formed of an electrolytic capacitor, a ceramic capacitor and a circuit arrangement. The circuit arrangement has a series circuit formed of a hybrid electrolytic capacitor and a suppressor diode as well as a resistance connected in parallel with the hybrid electrolytic capacitor.

8 Claims, 1 Drawing Sheet

(56) References Cited

U.S. PATENT DOCUMENTS

| | | | |
|---|---|---|---|
| 2010/0059023 A1 | 3/2010 | Schmauss et al. | |
| 2013/0240766 A1 | 9/2013 | Teramoto et al. | |
| 2014/0347896 A1* | 11/2014 | Chung | H02M 1/15 |
| | | | 363/34 |
| 2016/0087572 A1 | 3/2016 | Kato | |
| 2016/0374162 A1* | 12/2016 | Nakada | H05B 45/10 |
| 2018/0073934 A1 | 3/2018 | Horng et al. | |

FOREIGN PATENT DOCUMENTS

| | | | | |
|---|---|---|---|---|
| DE | 102007001414 B3 | 5/2008 | | |
| DE | 102016100061 A1 | 12/2016 | | |
| EP | 1903202 A2 | 3/2008 | | |
| WO | 2016060541 A1 | 4/2016 | | |
| WO | WO-2016060541 A1 * | 4/2016 | | H02H 9/025 |

OTHER PUBLICATIONS

Suppressordiode—Wikipedia Jan. 2, 2017.
Polymer-Elektrolytkondensator—Wikipedia Jan. 31, 2017.
Wikipedia: "Superkondensator", [Supercapacitor], Jan. 4, 2017—English version.
Wikipedia: "Suppressordiode", [Transient-voltage-suppression diode], Jan. 2, 2017—English version.
Wikipedia: "Polymer-Elektrolytkondensator", [Polymer capacitor], Jan. 31, 2017—English version.

* cited by examiner

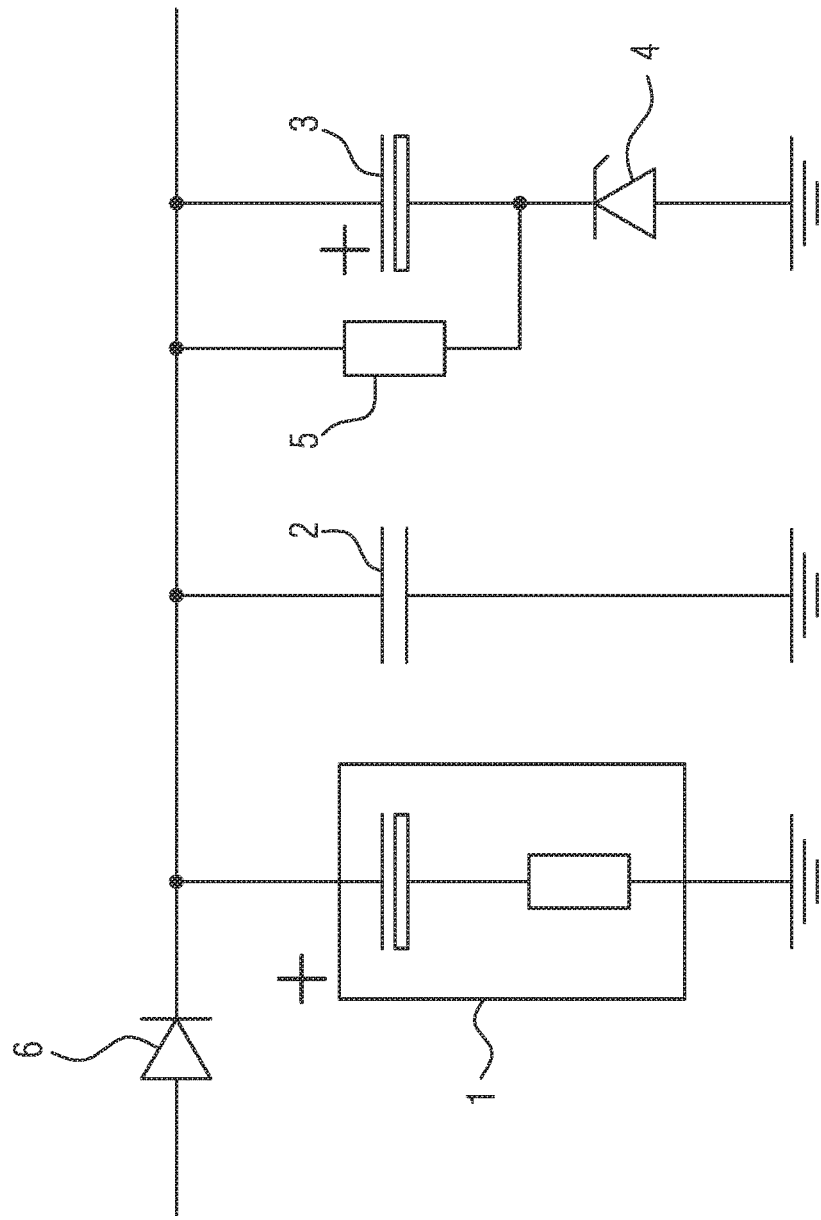

DC-DC CONVERTER WITH OUTPUT-SIDE STORAGE CAPACITOR ARRANGEMENT

BACKGROUND OF THE INVENTION

Field of the Invention

The invention relates to a DC-DC converter having an output-side storage capacitor arrangement.

DE 10 2007 001 414 B3 discloses such a DC-DC converter in which the storage capacitor arrangement is formed having an electrolytic capacitor.

In the field of automotive electronics, such DC-DC converters are used for operating solenoid-activated fuel injectors, wherein the electrolytic capacitor is provided to supply an operating voltage for said inductive load in order to be able to temporarily deliver a comparatively high electric current in a simple manner when the solenoid is actuated. The principle of providing feedback of electrical energy to the electrolytic capacitor after the solenoid is disconnected in order to be able to utilize the energy stored back in the next solenoid actuation is also known.

As illustrated and described in detail in DE 10 2007 001 414 B3, the electrolytic capacitors often used in automotive electronics have, in addition to their desired high capacitance, a parasitic series internal resistance, which is often referred to as ESR ("equivalent series resistance").

When energy is drawn from the electrolytic capacitor when a load is supplied by the DC-DC converter, the current flows to the load through said internal resistance and causes a corresponding voltage drop that reduces the voltage applied to the load. When the load is inductive, for example the mentioned solenoid arrangement in a solenoid valve, then the magnetic energy stored in the solenoid is reduced when the supply from the electrolytic capacitor is disconnected. In the case of an actuation circuit that makes it possible to feed said energy back to the electrolytic capacitor, a current with an opposite direction now flows through the internal resistance of the electrolytic capacitor, with the result that the clamping voltage thereof is now increased accordingly.

However, the currently available cost-effective electrolytic capacitors as cans with a capacitance of $\geq 500$ µF and a rated voltage of $\geq 60$ V have the property that the series resistance increases greatly at increasing negative temperatures. The series resistance (ESR) guaranteed by the supplier of $\leq 100$ mΩ at 25° C. can increase to a value of up to 1000 mΩ at −40° C. At a rated voltage at the electrolytic capacitor of 65 V and an assumed ESR of ~700 mΩ and a peak current of 5 A, the clamping voltage increases to a value of 65 V+700 mΩ*5 A=68.5 V.

In particular, when the operating voltage supplied by the DC-DC converter for the electrolytic capacitor is also used as supply voltage for at least one further electronic circuit or electronic component of the vehicle electronics system, said further electronic circuit or the electronic components thereof must be dimensioned so that the described excessive voltage increase does not exceed the maximum connection voltage thereof. Otherwise, such components may be damaged or even destroyed. However, there is also the additional problem here that, in many currently used semiconductors, the maximum reverse voltage thereof is reduced at low temperatures.

The currently often-used solution thus appears so that either the component parts bearing directly on the electrolytic capacitor are designed for a greater rated voltage (for example 90 V-100 V technology) or additional ceramic capacitors or MLCCs (multilayer ceramic chip capacitors), which are also very low-impedance at low temperatures, are installed parallel to the electrolytic capacitor. The number thereof is determined by the maximum voltage swing at the inductive load and the energy fed back. At the assumed rated voltage of 65 V, the available capacitance values in cost-effective component parts enabled for applications in motor vehicles are at values of 2.2 µF. With a required capacitance value of the ceramic capacitors of 25 µF, approximately 11 parts are therefore used in parallel. This causes higher costs due to the space requirement thereof on the printed circuit board and of course the component part costs.

SUMMARY OF THE INVENTION

It is the object of the present invention to provide a DC-DC converter by way of which the disadvantages mentioned above can be prevented and, in particular, an undesired excessive voltage increase in the freewheeling phase in an inductive load can be reduced.

The object is achieved by a DC-DC converter as described below. Advantageous developments are specified in the dependent claims.

Accordingly, the DC-DC converter has, in addition to the electrolytic capacitor, a ceramic capacitor and a circuit arrangement, which is formed having a series circuit composed of a hybrid electrolytic capacitor and a suppressor diode and a resistance connected in parallel with the hybrid electrolytic capacitor.

Given a low component part size, hybrid electrolytic capacitors have a high capacitance value based on the component part size with a low ESR over the entire desired temperature range but only a comparatively low rated voltage. This is balanced by the series suppressor diode in an inventive manner. The resistance connected in parallel with the hybrid electrolytic capacitor ensures that a low current always flows through the suppressor diode, with the result that said suppressor diode has no switching delay.

In advantageous embodiments of the DC-DC converter according to the invention, the electrolytic capacitor has a rated voltage of 50 V to 70 V and/or the hybrid electrolytic capacitor has a rated voltage of 30 V to 40 V.

BRIEF DESCRIPTION OF THE SINGLE VIEW OF THE DRAWING

The invention is explained in more detail below on the basis of an exemplary embodiment with the aid of a FIGURE. Here, the FIG. 1-shows the storage capacitor arrangement of a DC-DC converter according to the invention.

DESCRIPTION OF THE INVENTION

ADC-DC converter usually provide at its output the energy from an input energy source, via intermediate storage as magnetic energy in a coil, as electrical energy stored in an output capacitor, wherein the voltage at the output capacitor is controlled by means of clocked energization of the coil to prescribed value. The DC-DC converter can in this case be in the form of a step-down, step-up or inverting converter, a primary-clocked or secondary-clocked converter.

The output capacitor serves as a storage capacitor and, in the storage capacitor arrangement of FIGURE according to the invention, is formed having an electrolytic capacitor 1, having a ceramic capacitor 2 connected in parallel therewith and the series circuit, connected in parallel therewith, composed of a hybrid electrolytic capacitor 3 and a suppressor diode 4 and also a resistance 5 connected in parallel with the hybrid electrolytic capacitor 3. The storage capacitor arrangement is to be connected to the DC-DC converter via a reverse-biased diode 6. The suppressor diode 4 is changed to an on state by means of the resistance 5; here, a current of approximately 1 mA flows. The suppressor diode 4 has a damping voltage of approximately 40 V at a current of 1 mA. The cathode terminal of the diode 6 is also the output terminal of the DC-DC converter to which an, in particular inductive, load can be connected.

For the case of feedback of energy from an inductive load into the storage capacitor arrangement, the hybrid electrolytic capacitor 3 takes on the greatest proportion on account of its series resistance that is lower compared to the electrolytic capacitor 1 and capacitance that is greater compared to the ceramic capacitor 2, with the result that the voltage at the output terminal cannot increase to a value that could destroy other component parts connected thereto.

The suppressor diode 4 is to be designed so that the dynamic internal resistance thereof (change in the reverse voltage in the case of a Current change) is as low as possible. In addition, the suppressor diode 4 must be able to absorb a high pulse energy. The reverse current (leakage current) through the suppressor diode 4 must be lower than the current through the parallel resistance 5 by at least a factor of 10 so that no voltage peaks above the rated voltage can occur at the hybrid electrolytic capacitor 3 connected in series. Typical reverse currents of suppressor diodes are at values of up to 25 µA in the temperature range up to 125° C.

Typical can sizes for hybrid electrolytic capacitors are 8×8 mm with a height of 6 mm (100 µF/35 V) or 10×10 mm with a height of 1.0 mm (220 µF/35 V).

The peak power loss of the suppressor diode 4 must be greater than the maximum value of the peak feedback current multiplied by the clamping voltage of the suppressor diode 4.

The invention claimed is:

1. A DC-DC converter, comprising:
    an output-side storage capacitor arrangement having a parallel circuit formed of:
        an electrolytic capacitor,
        a ceramic capacitor, and
        a circuit arrangement, said circuit arrangement including:
            a series circuit composed of a hybrid electrolytic capacitor and a suppressor diode, an anode of said hybrid electrolytic capacitor connected to an output of the DC-DC converter and a cathode of said hybrid electrolytic capacitor being directly connected to a cathode of said suppressor diode; and
            a resistance connected in parallel with the hybrid electrolytic capacitor.

2. The DC-DC converter according to claim 1, wherein said electrolytic capacitor has a rated voltage of 50 V to 70 V.

3. The DC-DC converter according to claim 1, wherein said hybrid electrolytic capacitor has a rated voltage of 30 V to 40 V.

4. The DC-DC converter according to claim 2, wherein said hybrid electrolytic capacitor has a rated voltage of 30 V to 40 V.

5. A DC-DC converter, comprising:
    an output-side storage capacitor arrangement having a parallel circuit formed of:
        an electrolytic capacitor,
        a ceramic capacitor, and
        a circuit arrangement, said circuit arrangement including:
            a series circuit composed of a hybrid electrolytic capacitor and a suppressor diode, wherein an anode of the hybrid electrolytic capacitor is directly connected to an output of said output-side storage arrangement and a cathode of said hybrid electrolytic capacitor is directly connected to a cathode of said suppressor diode, and a resistance connected in parallel with the hybrid electrolytic capacitor.

6. The DC-DC converter according to claim 5, wherein said electrolytic capacitor has a rated voltage of 50 V to 70 V.

7. The DC-DC converter according to claim 5, wherein said hybrid electrolytic capacitor has a rated voltage of 30 V to 40 V.

8. The DC-DC converter according to claim 6, wherein said hybrid electrolytic capacitor has a rated voltage of 30 V to 40 V.

* * * * *